United States Patent
Yu et al.

(10) Patent No.: US 6,680,771 B2
(45) Date of Patent: Jan. 20, 2004

(54) THIN FILM TRANSISTOR LIQUID CRYSTAL DISPLAY WHEREIN THE LOWER ELECTRODE INCLUDES A FIRST ELECTRODE AND A PIXEL ELECTRODE

(75) Inventors: Jian-Shen Yu, Hsinchu (TW); Wei-Chih Chang, Hsinchu Hsien (TW)

(73) Assignee: AU Optronics Corp., Hsinchu (TW)

( * ) Notice: Subject to any disclaimer, the term of this patent is extended or adjusted under 35 U.S.C. 154(b) by 25 days.

(21) Appl. No.: 10/071,062

(22) Filed: Feb. 7, 2002

(65) Prior Publication Data

US 2002/0109813 A1 Aug. 15, 2002

(30) Foreign Application Priority Data

Feb. 14, 2001 (TW) ........................................ 90103234 A

(51) Int. Cl.[7] .................. G02F 1/1343; G02F 1/136; G02F 1/133
(52) U.S. Cl. .................. 349/139; 349/43; 349/138; 349/141; 349/143
(58) Field of Search .................. 349/139, 141, 349/138, 43, 129, 143, 144

(56) References Cited

U.S. PATENT DOCUMENTS 5,982,460 A * 11/1999 Zhang et al. .................. 349/39
6,335,776 B1 * 1/2002 Kim et al. .................. 349/129
6,476,898 B2 * 11/2002 Song et al. .................. 349/139
2002/0005927 A1 * 1/2002 Ko et al. .................. 349/129
2002/0105614 A1 * 8/2002 Nakayama et al. .......... 349/143

FOREIGN PATENT DOCUMENTS

JP 60-070633 A * 4/1985
JP 62-100734 A * 5/1987

* cited by examiner

Primary Examiner—Tarifur R. Chowdhury
(74) Attorney, Agent, or Firm—Ladas & Parry

(57) ABSTRACT

A thin film transistor liquid crystal display generates voltage difference between the lower electrodes, then the generating domains are controlled by the voltage difference. The lower electrode is divided into a narrow electrode and a pixel electrode. The pixel electrode is further divided into a plurality of pixel electrodes. The narrow electrode is coupled to a drain or a source of a thin film transistor, and a portion of the pixel electrode is overlapped on the drain/source of the thin film transistor but insulated to the drain/source of the thin film transistor to generate capacitive coupling and make the voltage level of the narrow electrode exceeds that of the pixel electrode. Thus, a horizontal electric fields is formed to generate multiple domains in a signal pixel.

7 Claims, 5 Drawing Sheets

THIN FILM TRANSISTOR LIQUID CRYSTAL DISPLAY WHEREIN THE LOWER ELECTRODE INCLUDES A FIRST ELECTRODE AND A PIXEL ELECTRODE

BACKGROUND OF THE INVENTION

1. Field of the Invention

The present invention relates in general to a thin film transistor liquid crystal display (THT-LCD). In particular, the present invention relates to a thin film transistor liquid crystal display generating voltage by capacitive coupling to form multiple domains.

2. Description of the Related Art

With liquid crystal display (LCD) applied to notebooks and monitors, the market for LCD is getting larger. When large, high resolution LCD panels are used for desktop monitors, wide viewing angle and quick response time is required.

For vertically aligned (VA) LCD, controlling the domain of the liquid crystal molecules to obtain a wider viewing angle for the LCD is an important technology. Most conventional LCDs are 90° twisted nematic type (TN) LCD, which have LCD panel and polarizers pasted on the outer surface thereof. The disadvantage of the conventional LCD is that the visual angle is narrow (about ±40° horizontal and ±30° vertical), the response time is slow (about 50 ms), and the color dispersion is severe. Therefore, it is hard to obtain a good LCD panel by conventional technology. Moreover, rubbing during manufacture will cause electricity discharge and contamination.

To manufacture the LCD panel with wide viewing angle, the prior art has developed many kinds of VA LCD structures. For example, FIG. 1 shows the patterned VA (PVA) type LCD developed by Samsung Company. In FIG. 1, there are slits 14 on the upper electrode 10 and the lower electrode 12 to form the horizontal electric field around the slits 14. The curved lines in the FIG. 1 represent the electric potential lines perpendicular to the electric field. Therefore, the arrangement direction of the liquid crystal molecules, perpendicular to the substrate, is turned by the horizontal electric field to form different arrangement directions in different domains.

In addition, Fujitsu Company provides a LCD structure with multiple domains vertical alignment (MVA), which forms protrusions on the upper electrode to provide a pre-lean angle for the liquid crystal molecule to make the liquid crystal molecule form different arrangement directions in the different domains.

The prior art mentioned above can provide LCD with wide viewing angle, but requires additional processes to form the slits or protrusions on the color filter. Moreover, the higher accuracy of the alignment between the upper substrate and the lower substrate is required, and the manufacture process is more complicated.

SUMMARY OF THE INVENTION

In one aspect the present invention provides a thin film transistor liquid crystal display. A first substrate and a second substrate are provided, in which an enclosed space is formed between the first substrate and the second substrate. A liquid crystal layer is filled in the enclosed space. An upper electrode is formed on the inner surface of the first substrate. A lower electrode is formed on the inner surface of the second substrate having a first electrode and a pixel electrode beside the first electrode. The first electrode is coupled to a drain/source of a thin film transistor, and a portion of the pixel electrode is overlapped on the drain/source of the thin film transistor but insulated from the drain/source of the thin film transistor. A plurality of polarizers are formed on the outer surface of the first substrate and the second substrate respectively. In another aspect the present invention provides a TFT-LCD with multiple domains formed by the voltage difference between the lower electrodes, which generates voltage difference by capacitive coupling to control the domain. In addition, the voltage difference is generated between the lower electrodes without adding additional data lines. Therefore, the number of chips needed for driving is decreased and the design of the TFT array is simplified. Moreover, the structure of the upper electrodes does not require modification. Compared with the patterned VA type LCD provided by Samsung Company and the multiple domains vertical aligned type LCD provided by Fujitsu Company, the disclosed manufacture process is simplified.

Preferably, the lower electrode is separated into at least two electrodes, the narrow electrode and the pixel electrode. The pixel electrode can further be separated into more pixel electrodes. In addition, the narrow electrode is coupled to a drain/source of a thin film transistor, and a portion of the pixel electrode is overlapped on the drain/source of the thin film transistor but insulated to the thin film transistor. Therefore, capacitive coupling is preferably generated to make the voltage of the narrow electrode higher than the pixel electrode. Hence, the horizontal electric field is formed between the narrow electrode and the pixel electrode to generate a plurality of domains in a pixel. Additional processing is not required to form slits or protrusions on the color filter and a requirement for high accuracy of alignment between the upper substrate and the lower substrate can be overcome.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE PREFERRED EMBODIMENT

Figure 1:
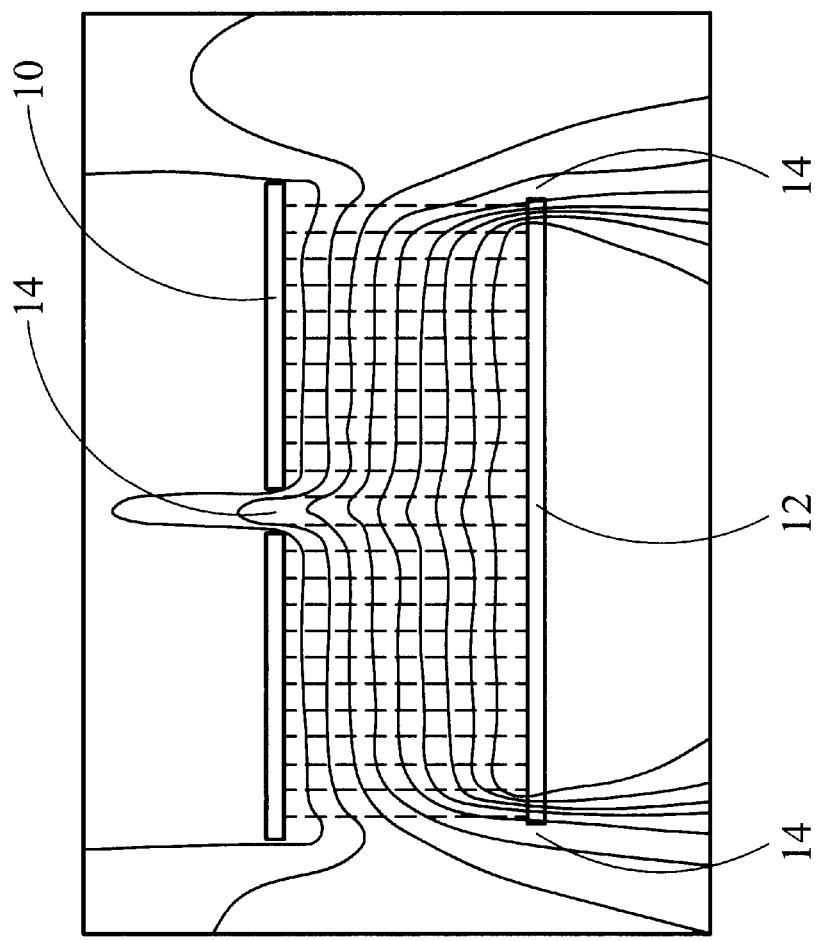
FIG. 1 shows the potential distribution of the conventional PVA type LCD.
Figure 2A:
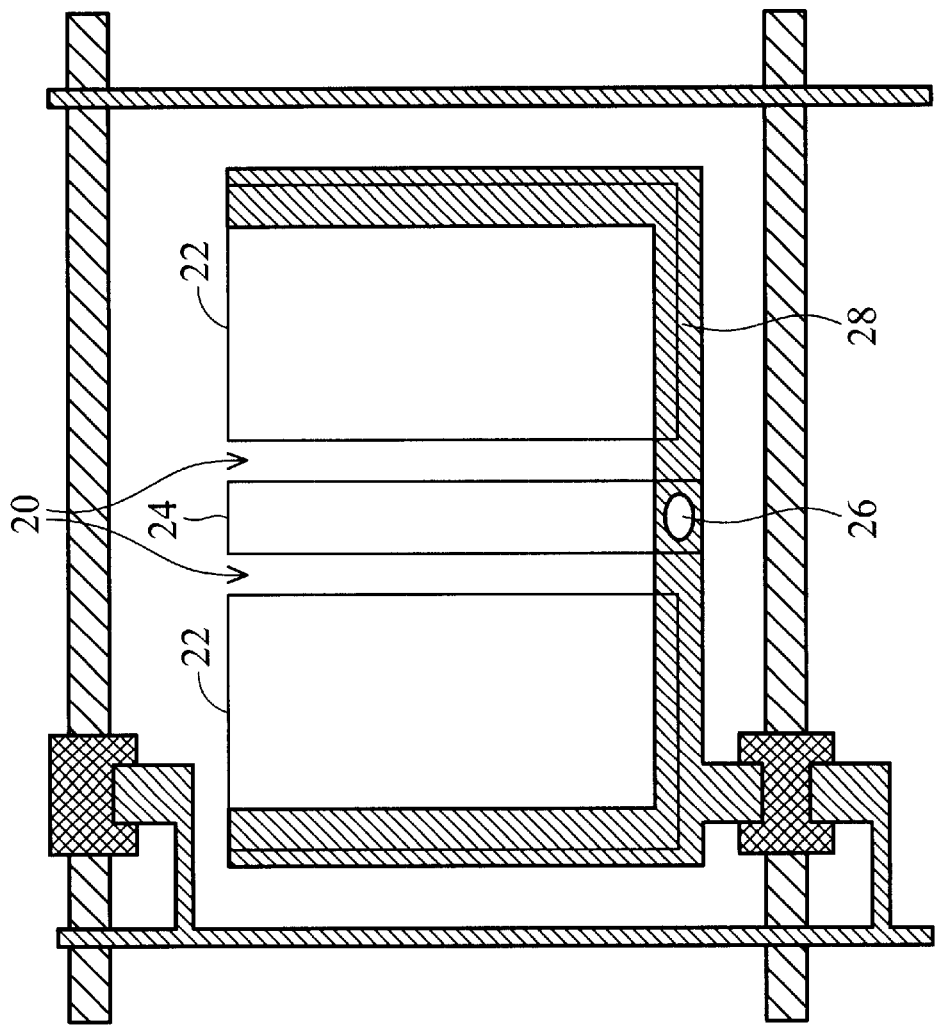
FIG. 2A shows the layout according to the embodiment of the present invention.
Figure 2B:
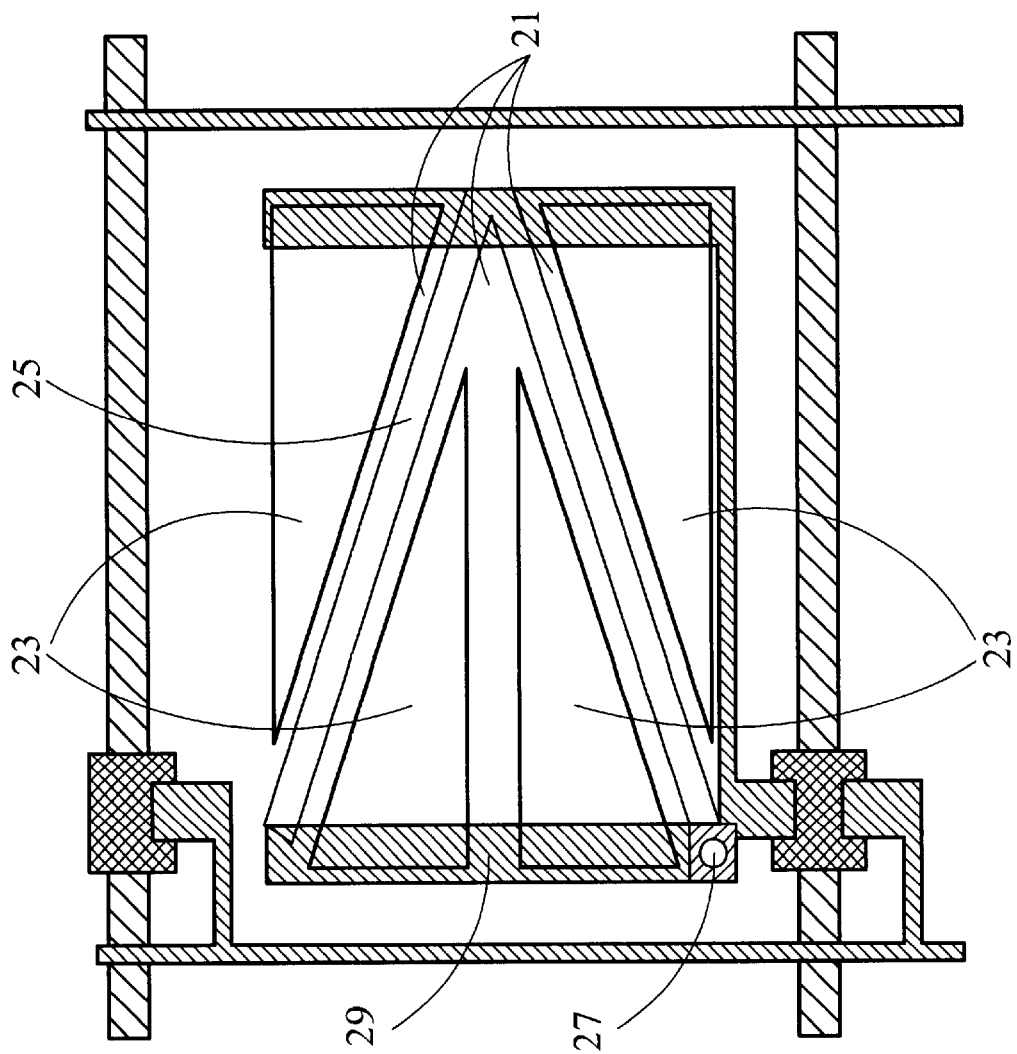
FIG. 2B shows the layout according to another embodiment of the present invention.

FIG. 2A and FIG. 2B shows the structures of the pixel according to the present invention. In the FIG. 2A and FIG. 2B, there are two examples comprising two and four domains.

First, in FIG. 2A, the lower electrode of the present embodiment is divided into three separate parts of pixel electrodes 22 and narrow electrode 24 by gaps 20. The pixel electrodes 22 are electro-floating, and the narrow electrode 24 is connected to the drain 28 through the contact hole 26. In FIG. 2B, the lower electrode of the present embodiment is divided into five separate parts of pixel electrodes 23 and narrow electrode 25 by gaps 21. The four pixel electrodes 23 are electro-floating, and the narrow electrode 25 is connected to the drain 29 through contact hole 27.

Figure 2C:
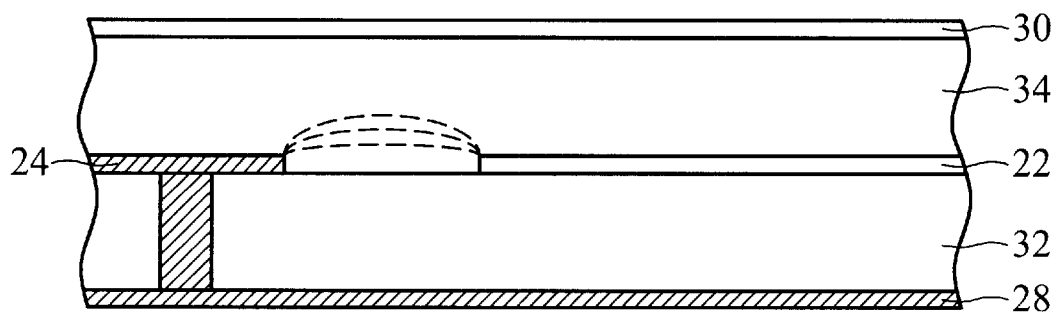
FIG. 2C shows the sectional view of the FIG. 2A.

FIG. 2C shows the sectional view of the FIG. 2A, which describes the structure of TFT-LCD cell generating voltage difference by capacitive coupling.

The voltage level of the upper electrode 30 having color filter is $V_2$, and the voltage level of the floating pixel electrode 22 is $V_f$. The narrow electrode 24 of the lower electrode is connected to the drain 28 of TFT with the voltage of $V_1$. In addition, $C_1$ is the capacitance between the pixel electrode 22 and the first dielectric layer 32 ($SiN_x$ for example), where $d_1$ is the thickness of the first dielectric layer 32, $A_1$ is the overlapping area between the first dielectric layer 32 and the pixel electrode 22, and $\epsilon$ is the dielectric constant of the first dielectric layer 32. The second dielectric layer 34 is liquid crystal layer. C2 is the capacitance between the pixel electrode 22 and the liquid crystal layer, where $d_2$ is the thickness of the liquid crystal layer, $A_2$ is the overlapping area between the liquid crystal layer and the pixel elcetrode 22, and $\epsilon_2$ is the dielectric constant of the liquid crystal layer.

Therefore, the voltage of the pixel electrode is:

$$V_f = (C_1 V_1 + C_2 V_2)/(C_1 + C_2) \quad (1)$$

Figure 3:
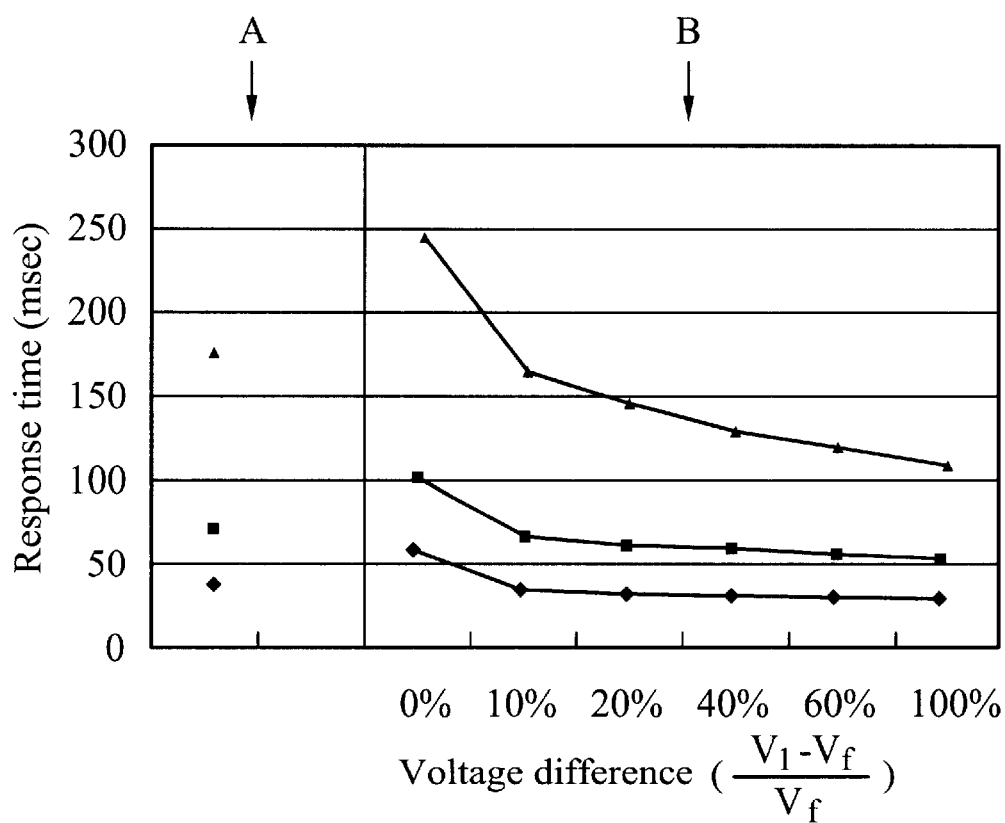
FIG. 3 shows the response time of the LCD according to the present invention and the conventional PVA type LCD.

FIG. 3 shows the simulated response time of the LCD according to the present invention and the conventional PVA type LCD. In FIG. 3, region A represents the response time of the conventional PVA type LCD, and region B represents the response time of the LCD according to the present invention. The symbol '▲' represents the response time while the voltage of the upper electrode is zero, and the voltage of the pixel electrode is 3V. The symbol '■' represents the response time while the voltage of the upper electrode is zero, and the voltage of the pixel electrode is 4V. The symbol '♦' represents the response time while the voltage of the upper electrode is zero, and the voltage of the pixel electrode is 5V. The response time of the present invention is obviously decreasing when the voltage of the narrow electrode is higher than the pixel electrode approximately 10%, which is better than the prior art.

The condition mentioned above can be expressed with the following equation:

$$V_f - V_2 < 0.9(V_1 - V_2) \quad (2)$$

According to equations (1) and (2), we can obtain equation (3):

$$C_1/C_2 < 9 \quad (3)$$

According to the equation of capacitance:

$$C = \epsilon A/d$$

We can obtain equation (4):

$$\epsilon_1 A_1 d_2 / \epsilon_2 A_2 d_1 < 9 \quad (4)$$

Therefore, if the condition of equation (4) is satisfied, there is sufficient voltage difference between the pixel electrode 22 and the narrow electrode 24 to obtain shorter response time than PVA type LCD.

Figure 4A:
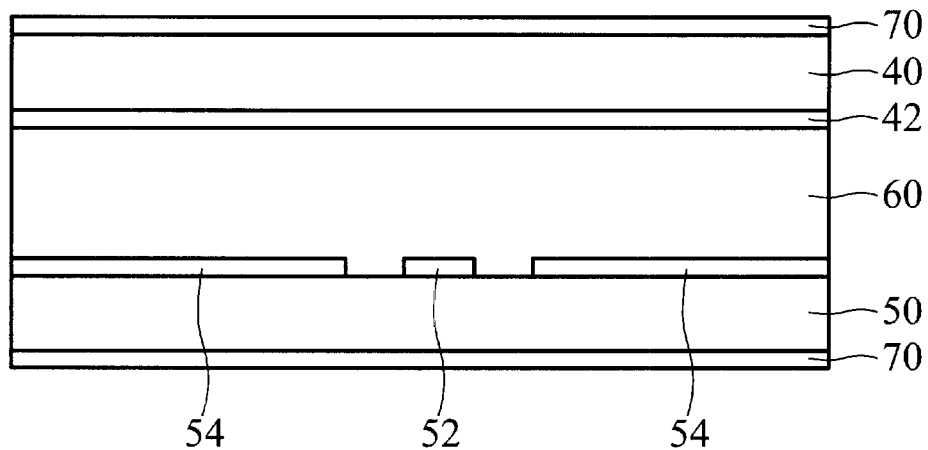
FIG. 4A shows the structure of the TFT-LCD according to the embodiment of the present invention.

FIG. 4A shows the structure of the TFT-LCD according to the embodiment of the present invention. The TFT-LCD according to the embodiment of the present invention an upper substrate 40, a lower substrate 50, a liquid crystal layer 60, an upper electrode 42, a lower electrode, and polarizers 70.

An enclosed space is formed between the upper substrate 40 and the lower substrate 50. The liquid crystal layer 60 is filled in the enclosed space. The upper electrode 42 is formed on the inner surface of the upper substrate 40. The lower electrode is formed on the inner surface of the lower substrate. The lower substrate comprises a narrow electrode 52 and at least one pixel electrode 54 beside the narrow electrode 52.

Figure 4B:
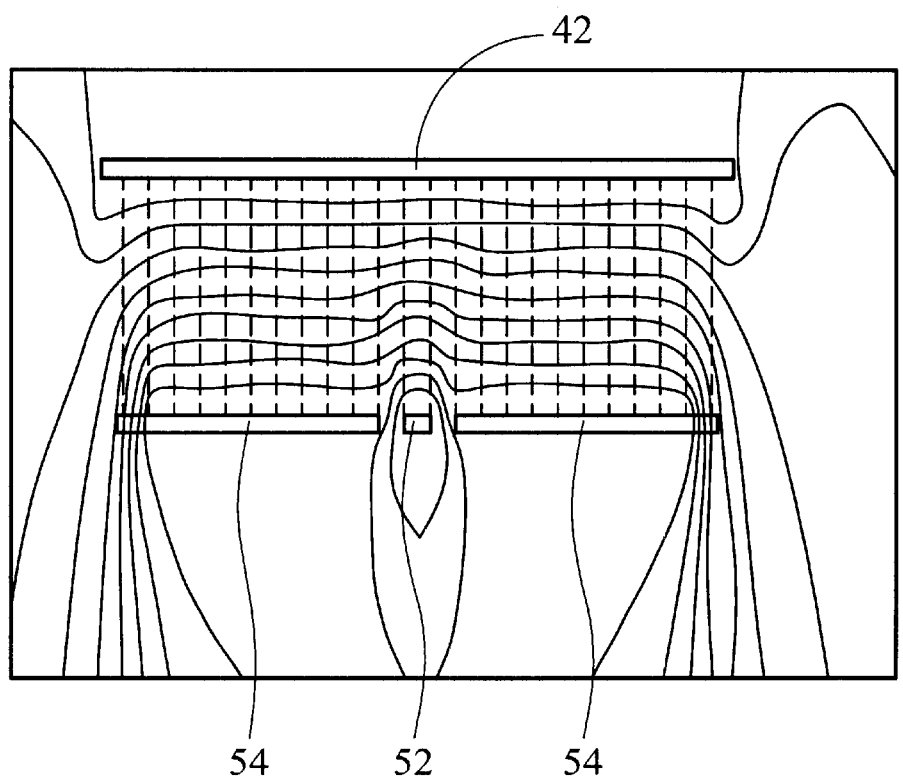
FIG. 4B shows the potential distribution of the TFT-LCD according to the embodiment of the present invention.

FIG. 4B shows the potential distribution of the TFT-LCD according to the embodiment of the present invention. According to the present embodiment, the upper electrode 42 is a pack electrode and connected to ground, and the lower electrode is divided into two pixel electrodes 54 and one narrow electrode 52. The voltage of the narrow electrode 52 is higher than the pixel electrode 54 from 5% to 200%. In addition, the narrow electrode 52 is coupled to a drain/source of a thin film transistor, and a portion of the pixel electrode 54 is overlapped on the drain/source of the thin film transistor but insulated to the drain/source of the thin film transistor. A plurality of polarizers is formed on the outer surface of the upper substrate 40 and the lower substrate 50 respectively.

In FIG. 4B, the horizontal electric field is formed between the narrow electrode 52 and the pixel electrode 54, the curved lines in the FIG. 4B represent the electric potential lines. The direction of the electric field of the present invention is similar to the conventional PVA type LCD, so the director of the liquid crystal molecule is similar to the conventional PVA type LCD. However, the present invention doesn't have to form additional slits on the upper electrode.

In the present invention, the lower electrode is divided into at least two pixel electrodes 54 and one narrow electrode 52. There is no limitation on the shape of the narrow electrode, so the shape of the narrow electrode can be a straight line or a curved line. The pieces, shape and size of the pixel electrode are not limited, and can be even or odd. The size of each domain is dependent on the design, and the size of gap is designed to generate sufficient horizontal electric field. Further, the liquid crystal layer according to the present inventiton is a negative type liquid crystal layer.

The structure of the present invention further can comprise compensative flakes, color filters, and reflector in different application. In addition, the structure of the present invention further comprises TFT and peripheral circuits.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A thin film transistor liquid crystal display, comprising:
    a first substrate and a second substrate, in which an enclosed space is formed between the first substrate and the second substrate;

a liquid crystal layer filled in the enclosed space;

an upper electrode formed on the inner surface of the first substrate;

a lower electrode formed on the inner surface of the second substrate having a first electrode and a pixel electrode beside the first electrode, wherein the first electrode is coupled to a drain/source of a thin film transistor, and a portion of the pixel electrode is overlapped on the drain/source of the thin film transistor but insulated from the drain/source of the thin film transistor; and a plurality of polarizers formed on the outer surface of the first substrate and the second substrate respectively.

2. The thin film transistor liquid crystal display as claimed in claim 1, wherein the liquid crystal layer is a negative type liquid crystal layer.

3. The thin film transistor liquid crystal display as claimed in claim 1, wherein the voltage level of the first electrode is higher than the pixel electrode from 5% to 200%.

4. The thin film transistor liquid crystal display as claimed in claim 1, wherein the first electrode is coupled to the drain of the thin film transistor.

5. The thin film transistor liquid crystal display as claimed in claim 1, wherein the pixel electrode is electro-floating.

6. The thin film transistor liquid crystal display as claimed in claim 1, wherein the voltage level of the pixel electrode is generated by capacitive coupling.

7. The thin film transistor liquid crystal display as claimed in claim 1, wherein the first electrode is relatively narrower than the pixel electrode.

* * * * *